United States Patent
Alcorn et al.

(10) Patent No.: US 8,533,775 B2
(45) Date of Patent: Sep. 10, 2013

(54) HIERARCHICAL POLICY MANAGEMENT

(75) Inventors: Byron A. Alcorn, Fort Collins, CO (US);
Roland M. Hochmuth, Fort Collins, CO (US); Jeffrey J. Walls, Fort Collins, CO (US); Valentin Popescu, Tomshall, TX (US); Thomas J. Flynn, Magnolia, TX (US); Quoc P. Pham, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 12/997,605

(22) PCT Filed: Jun. 13, 2008

(86) PCT No.: PCT/US2008/066964
§ 371 (c)(1),
(2), (4) Date: Dec. 12, 2010

(87) PCT Pub. No.: WO2009/151459
PCT Pub. Date: Dec. 17, 2009

(65) Prior Publication Data
US 2011/0093917 A1    Apr. 21, 2011

(51) Int. Cl.
*G06F 21/00* (2013.01)
(52) U.S. Cl.
USPC ............................... 726/1; 726/4; 726/14
(58) Field of Classification Search
USPC ............................................................. 726/1
See application file for complete search history.

(56) References Cited

U.S. PATENT DOCUMENTS

| | | | |
|---|---|---|---|
| 5,751,949 A * | 5/1998 | Thomson et al. | 726/4 |
| 6,134,549 A * | 10/2000 | Regnier et al. | 1/1 |
| 6,587,854 B1 * | 7/2003 | Guthrie et al. | 1/1 |
| 6,606,627 B1 * | 8/2003 | Guthrie et al. | 1/1 |
| 7,051,366 B1 | 5/2006 | Lamacchia et al. | |
| 7,653,930 B2 * | 1/2010 | Griffin et al. | 726/1 |
| 2003/0041198 A1 | 2/2003 | Exton et al. | |
| 2004/0039594 A1 | 2/2004 | Narasimhan et al. | |
| 2004/0162905 A1 * | 8/2004 | Griffin et al. | 709/229 |
| 2005/0005233 A1 * | 1/2005 | Kays et al. | 715/500.1 |
| 2005/0100211 A1 | 5/2005 | Gibson | |
| 2006/0069668 A1 | 3/2006 | Braddy | |
| 2007/0156691 A1 | 7/2007 | Sturms | |
| 2007/0255769 A1 * | 11/2007 | Agrawal et al. | 707/205 |
| 2008/0022358 A1 * | 1/2008 | Agarwal et al. | 726/1 |
| 2008/0052291 A1 * | 2/2008 | Bender | 707/9 |
| 2008/0168530 A1 * | 7/2008 | Kuehr-McLaren et al. | 726/1 |
| 2008/0209506 A1 * | 8/2008 | Ghai et al. | 726/1 |
| 2009/0007219 A1 * | 1/2009 | Abzarian et al. | 726/1 |

OTHER PUBLICATIONS

WIPO, PCT/US2008/066964, International Search Report, Mar. 13, 2009.
Chinese Office Action mailed Oct. 29, 2012 for Serial No. 200880129806.3 filed Jun. 13, 2008.
EP Extended Search Report dated Aug. 1, 2012—Application No. 08771057.0-1243.

* cited by examiner

*Primary Examiner* — Kambiz Zand
*Assistant Examiner* — Yonas Bayou

(57) ABSTRACT

A system and method for administering access to a central resource by a remote access device. A system includes a remote access device and a computer executing a hierarchical policy manager. The remote access device requests access to a central resource. The hierarchical policy manager determines a policy for allowing the device to access the resource by evaluating access policies at a plurality of precedence levels of a policy hierarchy. The hierarchical policy manager allows the device to access the resource based on the policy set at the highest precedence level of the policy hierarchy at which access control is specified.

18 Claims, 3 Drawing Sheets

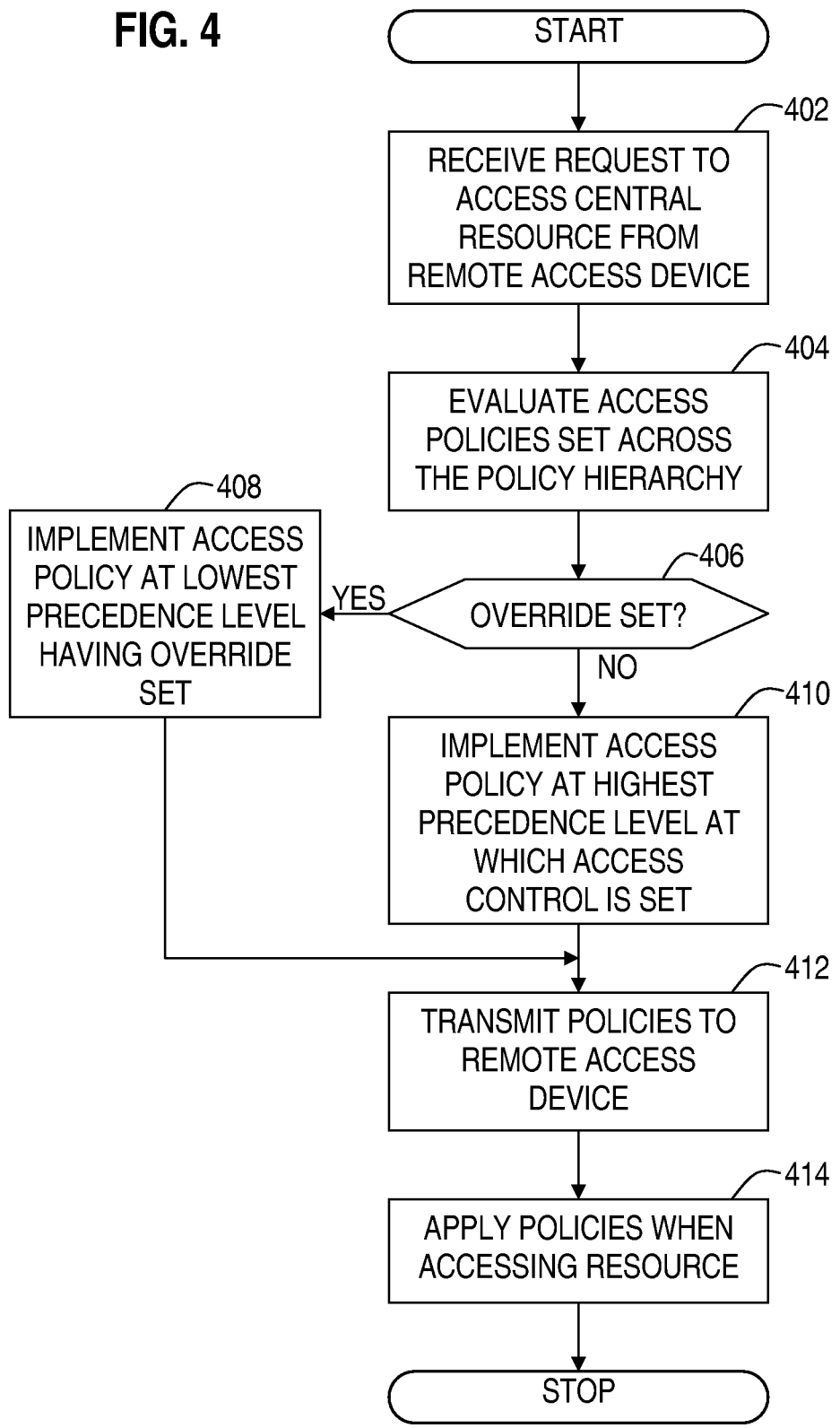

HIERARCHICAL POLICY MANAGEMENT

BACKGROUND

Prior to the advent of the personal computer, a mainframe or mini-computer supporting multiple individual user terminals was the dominant computing paradigm. This centralized architecture allowed for efficient use of expensive computer hardware and software resources by sharing those resources across multiple users.

With the coming of the relatively inexpensive personal computer, a new computing model arose that employed computing resources localized at each user to displace the remote and centralized resources typifying the earlier era.

The advantages of the centralized computing model are many however, ubiquitous networking has led to the resurgence of centralized computing in a variety of forms. In one embodiment, a server provides processing and/or storage resources to one or more remote clients. In other embodiments, a remote client is assigned exclusive access to a workstation or personal computer module maintained at a central site. In any embodiment, consolidation of data and program storage and/or computing resources reduces maintenance and support costs, while enabling increased system security. The remote client that accesses a centralized system may take various forms. A remote client having minimal processing and storage capabilities, and that relies on centralized resources for adequate functionality is known as a "thin client."

Centralized computer systems are not without disadvantages. For example, failure of a single server supporting multiple users results in a loss of productivity proportional to the number of users supported. Architectures assigning unshared resources to each remote client serve to mitigate such disadvantages. For example, Session Allocation Manager ("SAM") by Hewlett-Packard Company can dynamically allocate resources and has the capability of assigning backup resources to dedicated systems to mitigate potential downtime.

Each remote user connecting to a centralized system is assigned a set of resources. The extent of resources available to each user varies in accordance with the perceived needs of both the user and the organization. For example, a user may be assigned more or fewer resources in accordance with the applications utilized by the user, and/or the organization's need to maintain system security. Allocation of system resources to users is generally controlled by a system administrator. Flexible and efficient methods for controlling a remote user's access to system resources are desirable to administrators of systems supporting a large number of users.

BRIEF DESCRIPTION OF THE DRAWINGS

For a detailed description of exemplary embodiments of the invention, reference will now be made to the accompanying drawings in which:

FIG. 4 shows a flow diagram for a method of establishing a policy for allowing a remote access device to access a central resource in accordance with various embodiments.

NOTATION AND NOMENCLATURE

Figure 1:
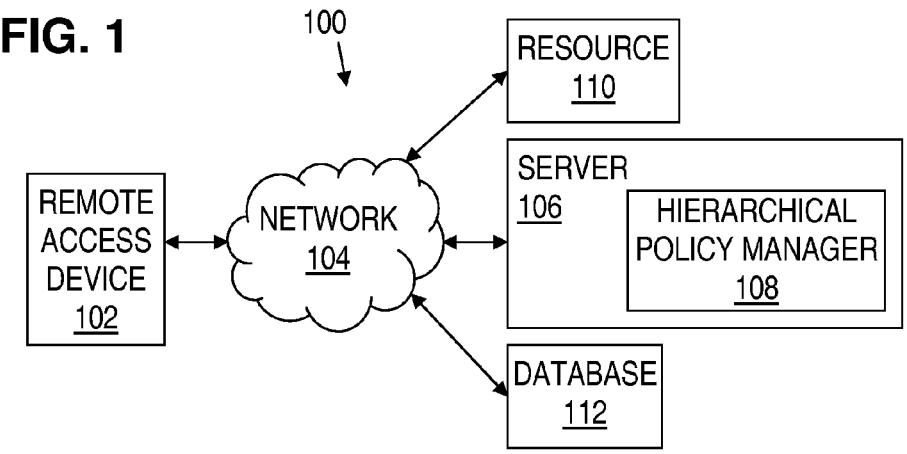
FIG. 1 shows a block diagram of a centralized computer system comprising a hierarchical policy manager in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Corporations and other entities deploy centralized computer systems for a variety of reasons. A centralized system provides enhanced security by allowing for control of the entity's data at a single location. Maintenance and support costs may also be lower than with de-centralized models because those functions can also be confined within a centralized data center.

Users may also benefit from the centralized model. Generally, a user may be able to access his system from any computer connected to the internet. A computer requesting access to a resource of a centralized system may be generally referred to as a "remote access device" or "client." The remote access device need have only enough local resources (e.g., computing power, storage capacity, etc.) to interface with the central resource and provide user input and output. Thus, a remote access device may be simpler, more reliable, and less costly than a computer providing capabilities equivalent to those offered by the central computer through the access device.

An issue arising in the management of a centralized system concerns control of the various central resources allocated to a remote user. Users of a central system may be grouped in a variety of ways to facilitate system security needs and efficient allocation of resources. System administrators require flexible and efficient means to control user access to central resources across such groupings. Embodiments of the present disclosure allow administrators of a centralized system to control allocation of resources to remote users at multiple levels. Each level of control is termed a policy level and the setting applied to a control parameter at a policy level is termed a policy. Embodiments of the present disclosure assign a priority to each of a plurality of policy levels to form a policy hierarchy. Policies are enforced in accordance with the policy set at the highest level of policy precedence having a policy setting. Embodiments further allow administrators to override the general policy hierarchy, and thus to force utilization of a policy set at a particular hierarchical level.

FIG. 1 shows a block diagram of a centralized computer system 100 comprising a hierarchical policy manager 108 in accordance with various embodiments. As used herein, a centralized computer system refers to a system wherein a remote access device 102 relies on a resource 110, for example, a computing or storage resource, not local to the remote access device 102. In FIG. 1, the remote access device 102 communicates with server 106 via the network 104 to gain access to the resource 110. Though, for purposes of illustration, only a single remote access device 102 is shown, in practice, system 100 may comprise any number of remote access devices 102. The greater the number of remote access devices 102 requesting access to a centralized resource 110, the more difficult the administration of the devices 102 becomes. Thus, embodiments of the present disclosure enabling flexible control of resource 110 allocations to the devices 102 become more important as the number of devices 102 increases. As described herein, a remote access device 102 corresponds to a user who uses the device to gain access to the central resource 110. The remote device 102 may be implemented as software programming executed on a variety of computing devices, for example, a personal computer, or a thin client computer appliance, or as a hardware device requiring no software to communicate with a central system.

In some embodiments, the remote access device 102 is a "thin client" comprising "connection client" and "remote access client" software programs. The connection client communicates with the server 106 to request resource access and access policies. The remote access client is responsible for connecting to the resource, and in some embodiments wherein the resource 110 comprises a computer (e.g., a PC blade) for displaying the desktop of the resource 110, and for connecting keyboard, mouse, universal serial bus ("USB"), audio, and other peripherals to the resource 110.

The remote access device 102 requests access to a resource. The resource may be dedicated to remote access device 102, one of a plurality of resources available for use by the remote access device 102. A resource is requested by communicating with the server 106 through the network 104. Here, access to the resource 110 is granted, and device 102 is notified by, for example, returning information identifying resource 110 to the device 102. After access to the resource 110 is granted, the remote access device and the resource 110 communicate through the network 104. The network 104 may comprise any computer networking technology, for example, a local area network ("LAN"), a storage array network ("SAN"), a wide area network ("WAN"), a metropolitan area network ("MAN"), the internet, etc. Accordingly, the components of system 100 are not restricted to any particular location or proximity to one another, but rather may be located at any distance from one another as required to meet the needs of the entity and/or the user.

The server 106 receives a request for access to a resource 110 from the remote access device 102. The server 106 comprises a software program executing on a computer device. The server 106 validates that the access request from device 102 is from a known user, for example, using Active Directory® by Microsoft®. Following authentication, the server 106 retrieves information related to the user, to the resource 110 designated for allocation to the user, and to the availability of the designated or alternative resources for allocation. The server 106 then informs the remote access device 102 of resource 110 availability. The information provided to the device 102 includes information, such as IP addresses or hostnames to allow the device 102 to access the resource 110 and the policies to apply when connecting to the device.

Embodiments of the server 106 include a user interface through which a system administrator assigns policies at the various levels of the policy hierarchy. The server 106 may be implemented as a software program executed on any of a variety of computing devices, for example, a personal computer, a workstation, a server computer, or any other computing platform adapted to execute the programming of server 106.

The resource 110 may be any hardware device, software program, or combination of the two not directly attached to the remote access device 102, to which the remote access device 102 seeks access. For example, in some embodiments, resource 110 comprises a computer device such as a workstation blade or a PC blade with associated software programs and data storage. In other embodiments, resource 110 may comprise a program or data storage device. In yet other embodiments, resource 110 may comprise a ration of the processing capability of a computing device (e.g., a server) and associated software programming.

A number of parameters may be applied when the remote access device 102 accesses the resource 110. For example, if the resource 110 requested by the remote access device 102 is a computing resource, such as a workstation blade or a PC blade, the settings of parameters related to displays, audio, keyboard functionality, USB devices, logging, etc., may be applied to the connection (i.e., connection to and interaction with) with the resource 110. Each of these parameter groupings may include numerous individual parameters. For example, display parameters may include screen resolution, image quality, and screen update algorithm selections. Embodiments allow for control of the parameters defining how the remote access device 102 accesses the resource 110 at each of the multiple levels of the policy hierarchy.

Figure 2:
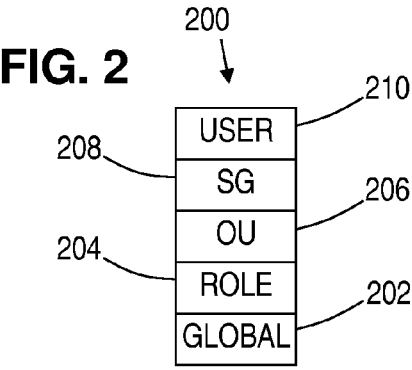
FIG. 2 shows an exemplary policy hierarchy in accordance with various embodiments.

FIG. 2 shows an exemplary policy hierarchy 200 comprising multiple policy levels in accordance with various embodiments. In some embodiments of policy hierarchy 200, User level 210 is the highest priority policy level and Global level 202 is the lowest priority policy level. A User level 210 policy is applied only to a specific individual user of the remote access device 102. A Global level 202 policy applies to all users of any remote access device 102. Role level 204, Organizational Unit ("OU") level 206, and Security Group ("SG") level 208 are successively higher priority policy levels sandwiched between Global 202 and User 210 levels. Role level 204 allows for grouping of users, and thus control of those users' access to resource 110 via Role level 204 policies. An example of a Role level 204 grouping includes grouping by job function, such as software developer, manager, or accountant. OU level 206 allows for grouping of users, for example, in accordance with an organization's functional or business structure. SG level 208 allows for grouping users, for example, in accordance with the resource access permissions granted to members of the group. Embodiments control access to resource 110 in accordance with the policies specified at the various levels of policy hierarchy 200, wherein policies specified at a higher priority level take precedence over policies specified at a lower priority level. Various embodiments may implement more or fewer policy levels than are shown in policy hierarchy 200, different policy levels than are shown in policy hierarchy 200, and/or assign different priorities to the policy levels implemented. Embodiments of the present disclosure encompass all policy hierarchy implementations.

Referring again to FIG. 1, embodiments of server 106 employ the policy hierarchy 200 to control access to resource 110 by remote access device 102. Hierarchical policy manager 108 determines which policy to apply by evaluating the policies specified at each level of the policy hierarchy. Absent the presence of an override condition at some level of the hierarchy, which is described infra, the policy specified at the highest priority policy level for each access parameter will be enforced to control access of remote device 102 to the resource 110. Hierarchical policy manager 108 may be implemented as software programming included in server 106 as illustrated. The hierarchical policy manager 108 program may be stored in a variety of storage devices (i.e., computer readable media) associated with the computer, for example, a hard disk drive, a compact disk read-only memory (CD-ROM), or random-access memory ("RAM"). The program storage device may be directly connected to the computer or connected via wired or wireless network.

In some embodiments, the server 106 sends the policies to be applied, as determined through the policy hierarchy 200, to the remote access device 102 along with the resource 110 identification (e.g., IP address). The remote access device 102 applies the policies when accessing the resource 110. If, for example, the remote access device 102 includes USB access capability, but USB access is disabled by a policy returned from the server 106, the remote access device 102 will disable USB access when connecting to resource 110.

Database 112 stores data related to server 106 operations in controlling access to the resource 110. For example, an embodiment of the database 112 may store resource assignment information, history, and/or error information relevant to resource 110 and/or remote access device 102. The server 106 accesses the database 112 for storage and retrieval of resource 110 information when allocating resource 110. Database 112 may be implemented as a software program executed on any of a variety of computing devices, for example, a personal computer, a workstation, a server computer, or any other computing platform adapted to execute the programming of database 112. In some embodiments, the database 112 may be coupled to the server 106 though a network 104 as shown in FIG. 1. In other embodiments, the database 112 may execute on the same computer platform as server 106 as a separate program or as a sub-program of server 106.

FIGS. 3A-3F show examples of policy selection by hierarchical policy manager 108 when applying multiple levels of policy precedence in accordance with various embodiments. Embodiments allow policies to take on a selection of values, including ON, OFF, USER CHOICE, BLANK (i.e., not assigned ("N/A")), and a variety of values pertinent to each individual parameter. ON and OFF reflect enabling and disabling at a policy level. USER CHOICE indicates that the user of remote access device 102 may select the value of the particular parameter if a policy level set to USER CHOICE is preeminent. N/A indicates that no policy is assigned at the selected policy level. Thus, policy selections such as ON, OFF, and USER CHOICE provide access control, while N/A does not.

Figure 3A:
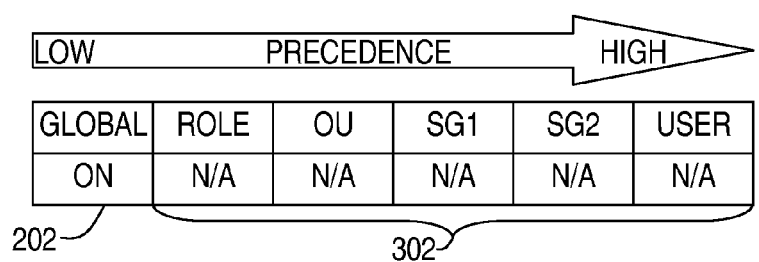
FIGS. 3A-3F show examples of policy selection when applying multiple levels of precedence of a policy hierarchy in accordance with various embodiments.

FIG. 3A shows a policy hierarchy 200 wherein the policy selected at the Global policy level 202 in ON, and N/A, no policy, is selected at all other levels 302 of the policy hierarchy. Under the conditions presented in FIG. 3A, the hierarchical policy manager will implement the policy ON for the parameter to which the policy selections apply. For example, if the parameter to which these policy selections apply is enabling USB access on the remote access device 102 to transfer data between a USB device on the device 102 and the resource 110, USB access will be enabled because ON is the only policy assigned in FIG. 3A. Thus, the Global level 202 policy controls when no higher priority policy is set.

Figure 3B:
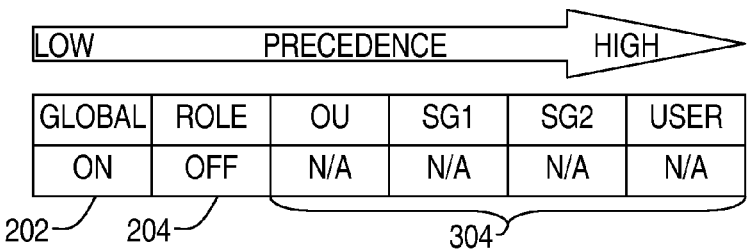

FIG. 3B shows a policy hierarchy 200 wherein the policy selected at the Global policy level 202 in ON, the policy selected at the Role policy level 204 is OFF, and N/A, no policy, is selected at all other levels 304 of the policy hierarchy. Because the Role level 204 has precedence over the Global level 202, the effective policy established by the hierarchical policy manager is OFF for the parameter to which these policy selections apply. Referring to the remote USB example, here USB access will be disabled and the remote access device 102 will be unable to transfer data between a USB device on device 102 and the resource 110.

Figure 3C:
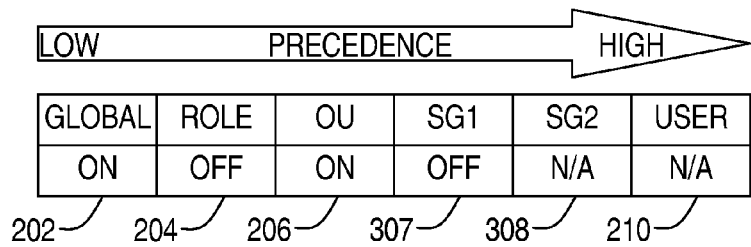

FIG. 3C shows a policy hierarchy 200 wherein the policy ON is selected at the Global 202 and OU 206 policy levels, OFF is selected as the policy at the Role and SG1 policy levels, and N/A, no policy, is selected at the SG2 308 and User 210 levels of the policy hierarchy. Under the conditions presented in FIG. 3C, the hierarchical policy manager will implement the policy OFF for the parameter to which the policy selections apply. This result follows from assigning a higher priority to the SG1 307 level of the hierarchy than the priority assigned to the OU 206, Role 204, or Global 202 levels. Referring again to the remote USB example, as in FIG. 3B described above, USB access will be disabled and the remote access device 102 will be unable to transfer data between a USB device on device 102 and the resource 110.

Figure 3D:
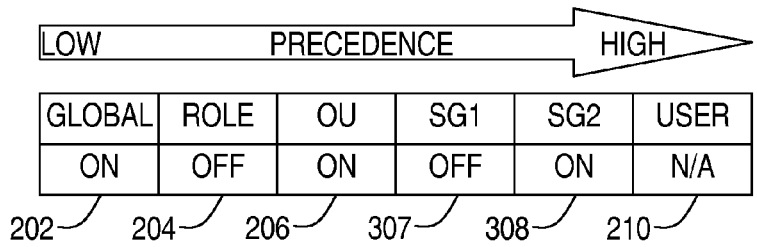

Referring now to FIG. 3D, which includes the policy OFF in SG1 and the policy ON in SG2. The two security groups, SG1 307 and SG2 308, compose sub-parts of the SG policy level 208. Embodiments applying multiple groups at a policy level determine which group policy to apply at that policy level. Some embodiments apply the policy of the first group identified. For example, if the hierarchical policy manager retrieves the groups in some order (e.g., alphabetically), the policy of the first group retrieved is applied. Thus, under this model, if the hierarchical policy manager identifies the SG1 policy prior to the SG2 policy, the SG1 policy is applied. On the other hand, if the SG2 policy is first identified, then the SG2 policy is applied. Other embodiments may apply different methods of determining which policy to apply when a policy level contains multiple groups. For example, the most recently set policy, or the most or least restrictive policy may be selected. Embodiments of the present disclosure encompass all methods of selecting a policy when a hierarchical policy level comprises multiple groups.

Figure 3E:
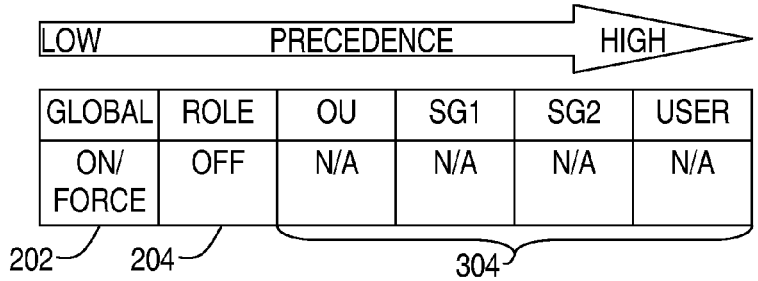

FIG. 3E shows a policy hierarchy 200 similar to that illustrated in FIG. 3B, wherein the policy selected at the Global policy level 202 in ON, the policy selected at the Role policy level 204 is OFF, and N/A, no policy, is selected at all other levels 304 of the policy hierarchy. However, in FIG. 3E, the Global policy level 202 includes a "Force" (i.e., an override) flag. The Force flag allows the system administrator to override the hierarchical priorities normally applied to determine which policy is preeminent. Because the Force flag is set at the Global level 202, the hierarchical policy manager will select ON as the effective policy notwithstanding the fact that the higher priority Role level 204 policy is set to OFF. Using the remote USB example, USB access will be enabled and the remote access device 102 will be able to transfer data between a USB device and the resource 110.

Figure 3F:
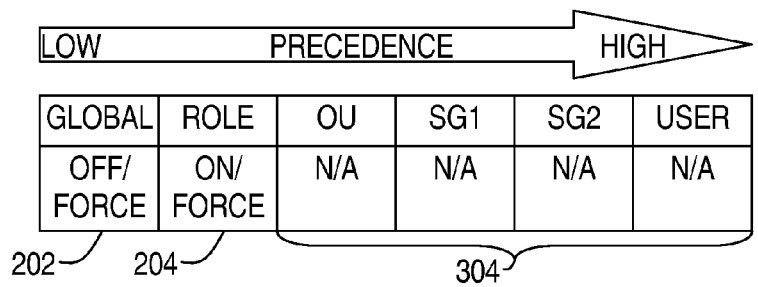

FIG. 3F shows a policy hierarchy 200 which includes the policy OFF at the Global policy level 202, and the policy ON at the Role policy level 204. Additionally, the Force flag is set at both the Global level 202 and the Role level 204. When the Force flag is set at multiple levels of the policy hierarchy, embodiments select the policy set at the lowest of the policy levels including a set Force flag. Thus, in FIG. 3F, the Global policy level 202 will once again provide the effective policy, notwithstanding that the Force flag is set at the Role level and the Role level has higher precedence than the Global level. Embodiments allow an administrator to control resource access at the various levels of granularity supplied by the policy hierarchy. For example, considering again the use of USB at remote access device 102, if a security issue related to use of remote USB is identified in the system, an administrator may disable remote USB at whatever level deemed necessary to secure the system until the problem is resolved. In FIG. 3F, remote USB is disabled as to all users. The Force flag allows such control without regard for the established precedence of the policy hierarchy.

FIG. 4 shows a flow diagram for a method of establishing a policy for allowing a remote access device 102 to access a central resource 110 in accordance with various embodiments. Though depicted sequentially as a matter of convenience, at least some of the actions shown can be performed in a different order and/or performed in parallel. In block 402, the server 106 receives a request for access to resource 110 from remote access device 102. The server 106 authenticates the remote access device 102, and retrieves information from the database 112 regarding the resources allocable to the device 102.

In determining the nature of access to resource 110 grantable to the remote access device 102, in block 404, the hierarchical policy manager 108 evaluates access policies set across the multi-level policy hierarchy. Policies applicable to a variety of access parameters conjoin to define the degree of access to the resource 110 that is granted to the remote access device 102. Each of the multiple levels of the policy hierarchy is assigned a priority. The level of highest priority having a policy setting generally establishes the policy enforced as to a specific access parameter. One or more levels of the policy hierarchy may not contain a policy setting, as explained supra in regard to the BLANK or N/A selections. Examples of effective policy settings include ON, OFF, USER CHOICE, and various values relevant to specific parameters (e.g., 1280×1024 as a display resolution parameter).

While hierarchical precedence normally establishes the policy imposed, the override flag (i.e., a Force flag) acts to countervail the usual hierarchical priorities. If, in block 406, an override flag is found set within a level of the policy hierarchy, hierarchical precedence is overridden, and the policy established at the lowest hierarchical level having a set override flag is selected for implementation in block 408.

If no level of the policy hierarchy contains a set override flag, then in block 410, the hierarchical policy manager selects for implementation the access policy established at the highest precedence level at which an access control policy is set.

The policies selected for implementation are transmitted to the remote access device 102, in block 412, along with identification of the resource 110 to which access is granted. In block 414, the remote access device 102 applies the policies received from the server 106 when accessing the resource 110.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a remote access device that requests access to a central resource; and
   a computer executing a hierarchical policy manager that determines a policy for allowing the device to access the resource by evaluating access policies at a plurality of precedence levels of a policy hierarchy;
   wherein the hierarchical policy manager allows the device to access the resource based on a policy set at the highest precedence level of the policy hierarchy at which access control is specified; and
   wherein the hierarchical policy manager allows the device to access the resource based on a policy set at the lowest precedence level of the policy hierarchy at which access control is specified and at which an override flag is set.

2. The system of claim 1, further comprising:
   a policy selection that assigns no policy at a level of the policy hierarchy; and
   a policy selection that allows a user to control a parameter setting from the remote access device.

3. The system of claim 1, wherein a policy determined by the hierarchical policy manager is transmitted to the remote access device and the remote access device applies the policy when accessing the central resource.

4. The system of claim 1, wherein the precedence levels of the policy hierarchy comprise, from high to low precedence, user level, security group level, organizational unit level, role level, and global level, and a policy assigned at the user policy level assigns the policy to an individual user and assigns the policy at the highest level of precedence applicable to the user, and a policy assigned at a global policy level assigns the policy to all users and assigns the policy at the lowest level of the policy hierarchy applicable to a user.

5. The system of claim 1, wherein a level of the policy hierarchy comprises a plurality of groups, each group comprising a policy and the first of the plurality of groups identified by the hierarchical policy manager provides the policy for the level.

6. The system of claim 1, wherein the central resource is a computer, and the policy controls access to a peripheral of the remote access device by the computer.

7. The system of claim 1, wherein each of the precedence levels specifies a different grouping of users that includes a user of the remote access device and a policy to be applied to the users for accessing the central resource.

8. A method, comprising:
   receiving a request for access to a central resource from a remote access device;
   determining a policy for allowing the device to access the resource by evaluating access policies specified at a plurality of hierarchical precedence levels within a policy hierarchy;
   allowing the device to access the resource based on a policy set at the highest precedence level of the policy hierarchy at which access control is specified; and
   allowing the device to access the resource based on a policy set at the lowest precedence level of the policy hierarchy at which access control is specified and at which an override flag is set.

9. The method of claim 8, further comprising providing a determined policy to the remote access device and applying the policy in the remote access device when the remote access device accesses the resource.

10. The method of claim 8, further comprising setting a policy at each of a user, security group, organizational unit, role, and global precedence levels, where each successive level is of lower precedence than the preceding level.

11. The method of claim 8, further comprising setting security group level policy to be the policy of the first identified security group if the security group level of the policy hierarchy comprises a plurality of security groups.

12. The method of claim 8, wherein the central resource is a computer, and the policy controls access to a peripheral of the remote access device by the computer.

13. The method of claim 8, wherein each of the precedence levels specifies a different grouping of users that includes a user of the remote access device and a policy to be applied to the users for accessing the central resource.

14. A computer program product, comprising:
a non-transitory computer useable medium having computer readable program code embodied therein, the computer readable program code comprising:
instructions that receive a request for access to a central resource from a remote access device;
instructions that determine a policy for allowing the device to access the resource by evaluating access policies specified at a plurality of successive hierarchical precedence levels of a policy hierarchy;
instructions that allow the device to access the resource based on a policy set at the highest precedence level of the policy hierarchy at which access control is specified; and
instructions that allow the device to access the resource based on a policy set at the lowest precedence level of the policy hierarchy at which access control is specified and at which an override flag is set.

15. The computer program product of claim 14, further comprising instructions that evaluate access policies at each of a user level, a security group level, an organizational unit level, a role level, and a global level, where each successive level is of lower precedence than the preceding level.

16. The computer program product of claim 14, further comprising instructions that set a policy for a level to be a policy of the first group identified for the level if the level comprises a plurality of groups.

17. The computer program product of claim 14, wherein the central resource is a computer, and the policy controls access to a peripheral of the remote access device by the computer.

18. The computer program product of claim 14, wherein each of the precedence levels specifies a different grouping of users that includes a user of the remote access device and a policy to be applied to the users for accessing the central resource.

* * * * *